United States Patent [19]

Ashton et al.

[11] 4,079,903
[45] * Mar. 21, 1978

[54] LIGHTWEIGHT CONTOURED LOAD CARRYING STRUCTURE

[75] Inventors: Larry J. Ashton, Long Beach; Dale P. Abildskov, San Pedro, both of Calif.

[73] Assignee: Fiber Science, Inc., Gardena, Calif.

[*] Notice: The portion of the term of this patent subsequent to Dec. 18, 1990, has been disclaimed.

[21] Appl. No.: 416,965

[22] Filed: Nov. 19, 1973

Related U.S. Application Data

[63] Continuation-in-part of Ser. No. 134,973, Apr. 19, 1971, Pat. No. 3,779,487.

[51] Int. Cl.² .............................................. B64C 3/24
[52] U.S. Cl. .................................... 244/123; 416/226; 416/230
[58] Field of Search ................... 244/123, 117 R, 124, 244/125, 133; 416/230, 226, 241 A; 52/84

[56] References Cited

U.S. PATENT DOCUMENTS

| 1,930,285 | 10/1933 | Robinson | 244/123 |
|---|---|---|---|
| 2,540,482 | 2/1951 | Hervey | 244/123 |
| 2,734,586 | 2/1956 | Wright et al. | 244/123 |
| 3,028,292 | 4/1962 | Hinds | 244/123 |
| 3,450,374 | 6/1969 | Moore | 244/123 |
| 3,528,753 | 9/1970 | Dutton et al. | 416/230 |
| 3,713,753 | 1/1973 | Brunsch | 416/230 |
| 3,768,760 | 10/1973 | Jensen | 244/123 |
| 3,771,748 | 11/1973 | Jones | 244/123 |
| 3,779,487 | 12/1973 | Ashton et al. | 244/123 |

FOREIGN PATENT DOCUMENTS

| 575,732 | 8/1924 | France | 244/123 |
|---|---|---|---|
| 720,956 | 12/1954 | United Kingdom | 244/123 |

*Primary Examiner*—Galen L. Barefoot
*Attorney, Agent, or Firm*—Blakely, Sokoloff, Taylor & Zafman

[57] ABSTRACT

Contoured load carrying filament reinforced matrix structure which may be in the form of an airfoil or hydrofoil and comprising a plurality of elongated coextensive tubes disposed in side-by-side relationship to form a tube assembly and individually of sufficient cross section to project substantially from one side to the other of the cross sectional contour of the foil with the opposite cross sectional extremities of such tubes cooperating to form a composite cross sectional contour defining the contour of such foil. A skin is wrapped around the composite tube assembly and is bonded thereto to secure such filament wound tubes in position and provide for good load distribution when such foil is loaded.

13 Claims, 11 Drawing Figures

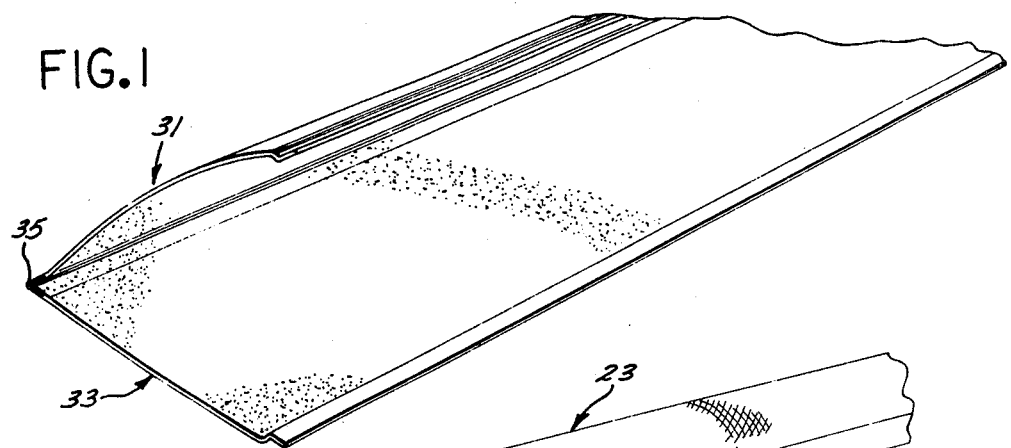
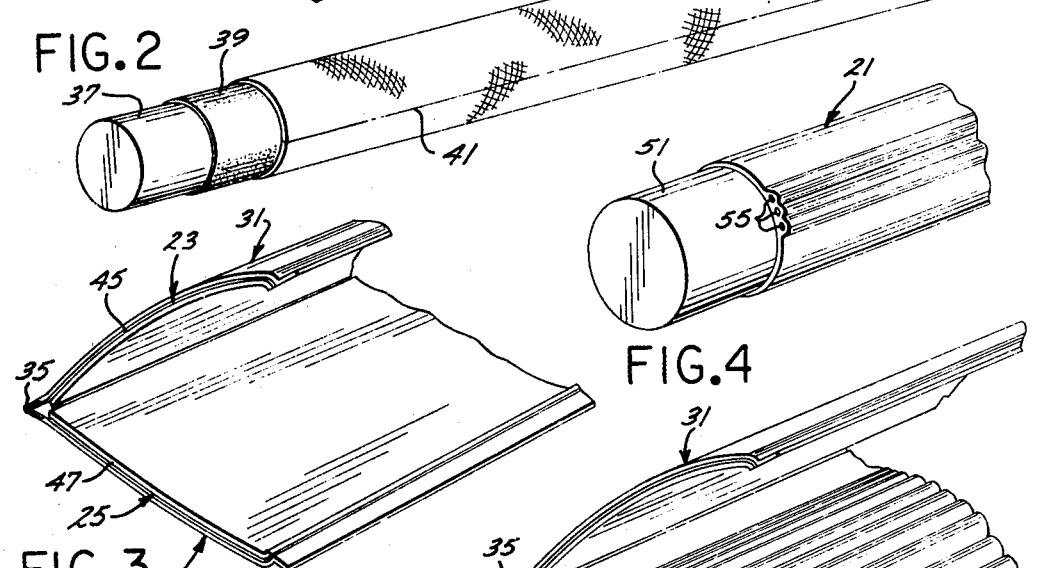
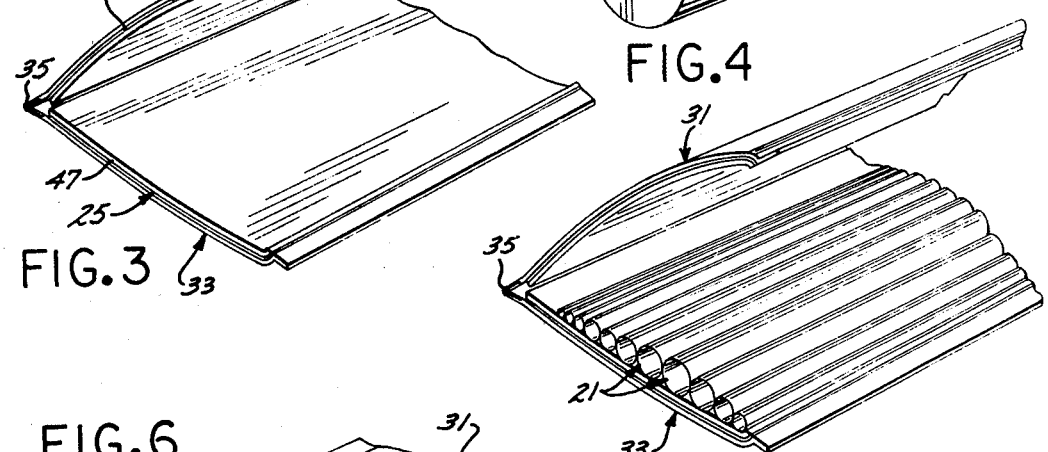
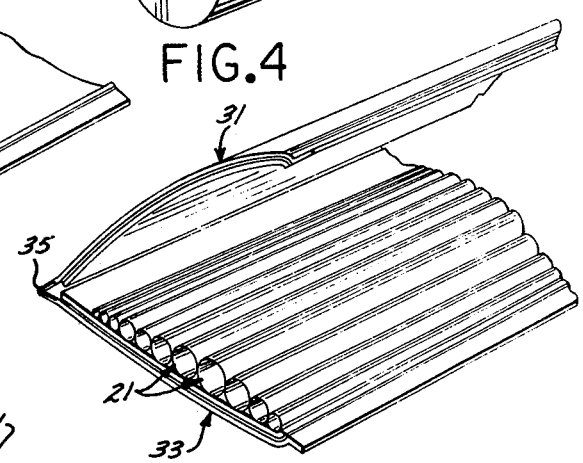
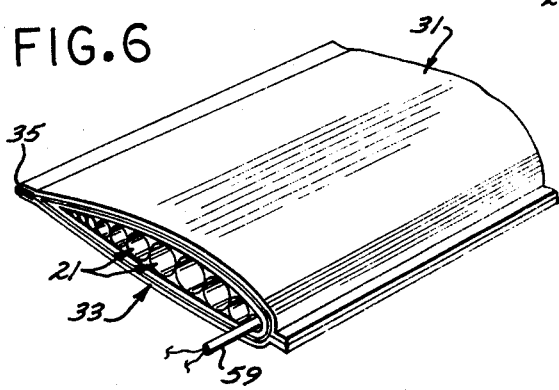
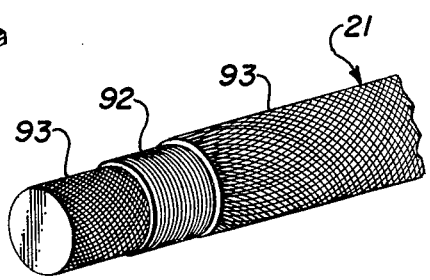

LIGHTWEIGHT CONTOURED LOAD CARRYING STRUCTURE

CROSS REFERENCE TO RELATED APPLICATIONS

This application is a continuation-in-part of our co-pending application Ser. No. 134,973, filed Apr. 19, 1971, and now U.S. Pat. No. 3,779,487.

BACKGROUND OF THE INVENTION

1. Field of the Invention

The present invention relates to a lightweight contoured structure such as an airfoil or hydrofoil.

2. Description of the Prior Art

Conventional airfoils such as airplane wings or helicopter rotor blades are frequently constructed from a series of ribwork generally defining the overall contour and covered with aluminum skin which is riveted to such ribwork. Contoured structures of this type suffer the shortcoming that they are relatively expensive to manufacture and do not have good load carrying characteristics. Many efforts have been made to improve conventional wing structures of this type.

Helicopter rotor blades have been proposed which include a plurality of coextensive tubular cells constructed of tubes formed with woven fiber glass walls and which are covered by a fiber glass skin to form the outline of an airfoil. Such an arrangement is shown in U.S. Patent No. 3,028,292. Airfoils of this type suffer the shortcoming that the tubular members cannot carry high bending stresses to which rotor blades are normally subjected.

Further, turbine blades have been proposed which include a thin metal skin filled with a sponge-like core and having lightening cavities formed therein by means of coextensive aluminum tubes. An arrangement of this type is shown in Great Britian Pat. No. 720,956.

Applicants are not aware of any prior art air-foil structure which takes advantage of the high strength characteristic of fine filament employed in winding processes to provide a practical foil structure.

SUMMARY OF THE INVENTION

The lightweight load carrying contoured structure of present invention is characterized by a plurality of coextensive tubular filament wound members disposed in side-by-side relationship to form a tube assembly, and of sufficient individual cross section to extend from one side to the other of the composite structure and terminating in opposite sides with respective extremities that cooperate to form a line defining the contour for the respective opposite sides of such structure. The tubular members are covered by skin means which is affixed thereto to tie such tubes together for good load carrying characteristics.

An object of the present invention is to provide a lightweight load carrying structure of the type described which may be employed as a large helicopter rotor blade in the order of 50 feet in length, having a chord length of four feet and a depth of six inches.

Another object of the present invention is to provide a load carrying structure of the type described wherein the tubular members form a plurality of redundant load carrying elements which provide multiple load paths.

Another object of the present invention is to provide a load carrying structure of the type described wherein the tubular members define passageways to act as fuel tanks or for receipt of electrical conduits and the like.

A still further object of the present invention is to provide a load carrying structure of the type described wherein the tubular members include high tensile and-/or high modulus filaments incorporated in opposite sides thereof for resisting transverse bending of such members.

These and other objects and the advantages of the present invention will become apparent from a consideration of the following detailed description when taken in conjunction with the accompanying drawings.

BRIEF DESCRIPTION OF THE DRAWINGS

FIG. 1 is a perspective view of a mold in which contoured load carrying structure embodying the present invention may be formed;

FIG. 2 is a perspective of a mandrel having filament windings thereon which may be used in forming the skins in a load carrying structure of the present invention;

FIG. 3 is a perspective view of the mold shown in FIG. 1 with a skin formed by the windings shown in FIG. 2 positioned therein;

FIG. 4 is a perspective view of a mandrel having a filament wound tube therein which may be incorporated in a load carrying structure embodying the present invention;

FIG. 5 is a perspective view similar to FIG. 3 and with a plurality of tubular members as shown in FIG. 4 positioned in side-by-side relationship on the lower half of the mold;

FIG. 6 is a perspective view similar to FIG. 5 but with the mold closed;

FIG. 11 is a perspective of a mandrel having a filament wound tube thereon having a sandwich construction of circumferential and spiral windings.

DESCRIPTION OF THE PREFERRED EMBODIMENT

Figure 7:
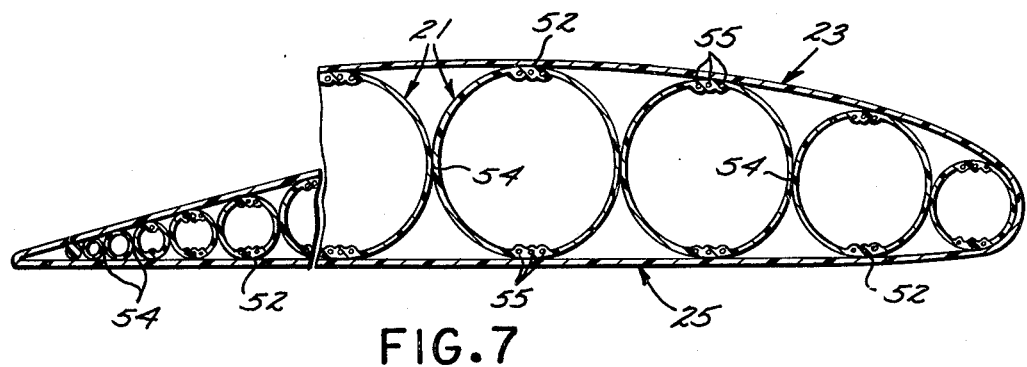
FIG. 7 is a broken transverse sectional view of a lightweight load carrying structure embodying the present invention.

Referring to FIG. 7, the contoured lightweight load carrying structure of present invention may be in the form of an airfoil forming a helicopter rotor blade and includes, generally, a plurality of coextensive filament would tubes 21 of different cross sectional size and disposed in side-by-side relationship to form a tube assembly. In the particular embodiment shown the tubes 21 are sized to cause the opposite transverse extremities thereof to define the contours of opposite sides of an airfoil. The tubular members 21 are covered on their top and bottom sides by respective upper and lower skins 23 and 25 and the space between adjacent tubular members 21 may then be filled with a stiffening core material such as a conventional cellular foam. The resultant structure provides highly desirable load carrying characteristics and is relatively lightweight thereby providing the general qualities which are highly desirable for use in aircraft structures.

The clam shell type mold shown in FIG. 1 may be utilized in manufacturing the lighweight load carrying structure shown in FIG. 7 and includes respective upper and lower halves 31 and 33 which are connected together along one edge by means of a piano-type hinge 35. The mold halves 31 and 33 may be reinforced to positively maintain the desired contour and are polished on their interior to provide the desired surface smoothness for the airfoil skin.

Referring to FIG. 2, the upper and lower airfoil skins 23 and 25 may be constructed of any desirable material such as aluminum or the like, and those in the preferred embodiment are made from a filament wound sheet formed on a cylindrical mandrel 37. The mandrel 37 has a carrier wrapped thereon which may be in the form of a large sheet of heavy waxed paper 39. The skin 23 may be wound by a conventional filament winding device and is preferably wound from a substantially continuous filament forming a plurality of plies, of approximately 0.012 inches thick. The plies are preferably applied in alternate patterns of resin impregnated fiber glass filament with one pattern being wound circumferentially and the next pattern being wound at 45° to the circumference of the mandrel 37 and continuing in a substantially spiral pattern extending from one end to the other of the mandrel.

After forming of the skin 23 is completed, such skin and the release paper 39 are slit longitudinally at 41 and the combined skin and release paper 39 transferred to the upper mold half 31. It will be realized that the mold halves 31 and 33 are pre-coated with a gel coat and the windings of the skin are rubbed into such gel coat and the release film removed therefrom to leave the windings of the skin 23 in position. The lower skin 25 is formed in a similar manner and placed on the gel coat in the lower mold half 33. An alternate approach would be to make the skins from fiber glass fabric impregnated by resin. Flexible plastic bags are then fitted over the respective mold halves 31 and 33 and a vacuum drawn therein to press the respective upper and lower skins 23 and 25 firmly against the mold halves to assure that such skins take the shape of the respective mold halves and to remove any pockets of air that may have formed thereunder. The composite skin is then allowed to cure before the tubular members 21 are placed in position.

Referring to FIG. 4, the tubes 21 may be formed on a mandrel 51 similar to the mandrel 37 and may also be wound by a conventional filament winding machine to form continuous patterns of glass filament. For the particular construction shown, the mandrels are tapered to provide for convenient removal of the tubes 21 and to form such tubes with a taper to provide a taper longitudinal in the structure formed. Again, as shown in FIG. 11, the windings are preferably in plies with part of the plies being formed by circumferential windings 92 sandwiched between plies formed by windings 93 oriented at an angle of 45° to the circumference and extending in a substantially spiral pattern from one end to the other of the respective tubes to thereby provide desirable load carrying capabilities.

Extending longitudinally on opposite sides of the tubes 21 and integrated therein are a plurality of high tensile strength and stiffness fibers 55 which are positioned on the top and bottom sides of the wings to act under tension and compression to carry the longitudinal bending loads. The reinforcing fibers 55 may be in the form of ribbons of carbon or boron constituting bundles of individual strands 55.

It is noted that the mandrel 51 tapers from left to right as shown in FIG. 4 to thereby provide slightly tapered tubular members 21 thereby the composite wing structure will taper slightly from its base to its wing tip.

As best seen in FIGS. 5 and 7, the tubes 21 are relatively large in cross section and the tubes on opposite sides thereof become progressively smaller in cross section with those to the left of the central tubular member becoming smaller in cross section at a more gradual rate than those on the right side to thereby provide a gradual taper which forms the trailing edge of the wing.

Upon construction of an airfoil, the mold is opened and the interior of the skins 23 and 25 coated with resin. The tubes 21 are then placed in position as shown in FIG. 5 on the lower skin 25 and the contacting sides of adjacent tubes 21 coated with resin. The mold is then closed and locked as shown in FIG. 6 and the structure allowed to cure to form a bond between the tubes and skin at 52 and between adjacent tubes at 54 so the desired airfoil contour will be maintained upon loading thereof. If desirable, the longitudinal cavities formed between the tubes 21 may be filled with a light-weight filler foam.

Not only is such airfoil relatively inexpensive to manufacture but it will provide highly desirable load carrying characteristics when utilized as a cantileverly mounted rotor blade or the like. It will be appreciated that upwardly acting loads applied to the tip extremities of such blades will produce spanwise bending moments which will be resisted by cooperation of the respective bonded together tubes 21 and the cooperating skins 23 and 25. Additionally, the longitudinal fibers 55 will be placed under stress and will be highly effective in resisting such bending.

Additionally, forces acting upwardly along the lower surface of the airfoil will be transferred directly to the tubes 21 thereby substantially reducing the normally high shear forces experienced in conventional riveted wing structure. A further feature of this structure is the capability of all the tubular members 21 to cooperate in resisting transverse moments resulting from loads applied thereto at points spaced from the chordal center line thereof. Furthermore, the formation by beach tubular member of a passageway which may receive electrical conduits 59 (FIG. 6), de-icing heaters or even act as fuel tanks themselves, further adds to the usefulness of the airfoil of the present invention.

Figure 8:
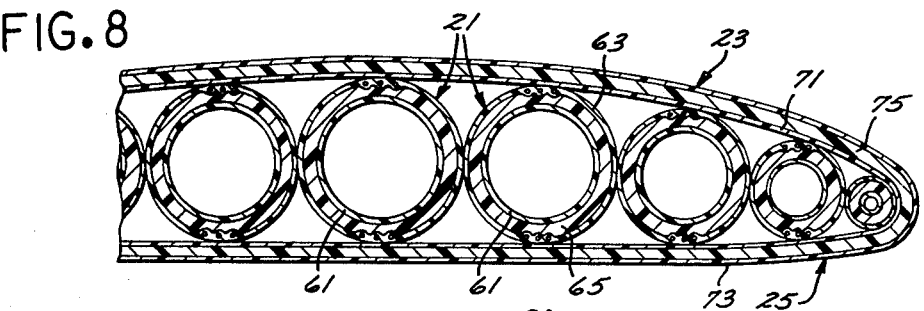
FIGS. 8, 9 and 10 are transverse sectional views similar to FIG. 7 but showing respective first, second and third modifications of the load carrying structure shown in FIG. 7.

The lightweight contoured structure shown in FIG. 8 is also formed to define an airfoil and is similar to that shown in FIG. 7. The tubular members 21 are of sandwiched construction and include filament wound exterior tubes 63 having respective reduced-in-diameter filament wound interior tubes 61 telescoped thereinto and cooperating therewith to define respective annular passages for receipt of substantially noncompressive stiffening foam 65. Additionally, the respective upper and lower skins 23 and 25 are of sandwiched construction and include respective interior filament wound skins 71 and 73 disposed coextensive therewith and cooperating therewith to form a peripheral chamber for receipt of stiffening foam 75.

Consequently, when the airfoil shown in FIG. 8 is used as a rotor blade or the like and lifting forces are applied to the underside thereof at a point spaced from a vertical line through the diametrical centers of any of the tubes 21, such forces will be distributed chordwise and spanwise along the sandwiched skins 71 and 73 and filler foam 75 to be distributed to the underside of nearby tubes 21 for favorable distribution thereof without excessive flexing or distortion of the exterior skin 23. Further, the sandwiched tubes 61, 63 and filler foam 65 will serve to resist forces so applied upwardly thereagainst and resist flexing of the composite sandwiched tubes 21 upon loading thereof.

Figure 9:
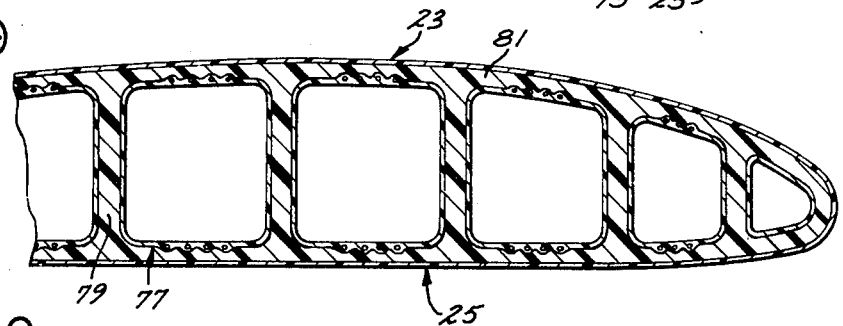

FIG. 9 depicts a lightweight contoured load carrying structure which incorporates tubular members, generally designated 77, that have a cross section in the form of modified squares and are disposed in side-by-side relationship but spaced apart a selected distance to form vertically extending passageways for receipt of stiffening foam 79 which act as vertical webs. Further, it will be noted that the tubular members 77 are of sufficient depth and spaced to provide a space between their upper and lower sides and the respective skins 23 and 25 to cooperate in forming a peripheral chamber for receipt of stiffening foam 81. Consequently, during construction the tubular members and pre-cut stiffening foam may be placed in the skins 23 and 25 and integrally bonded together.

Consequently, when the airfoil shown in FIG. 9 is mounted cantileverly as a rotor blade, wing or the like, forces acting upwardly near the spanwise tip of such blade will apply spanwise bending moments to the tubes 77 with the continuous fibers in such tubes, as reinforced, acting to resist such bending moments, it being appreciated that the filler foam 79 and 81 acts to secure the respective tubes 77 in fixed position with respect to one another and with respect to the exterior filament wound skin 23. Further, the foam lining the interior of the upper and lower skins 23 and 25 acts to provide for distribution of localized forces applied thereto to provide for favorable distribution thereof amongst the several tubes 77 of the entire tube assembly.

Figure 10:
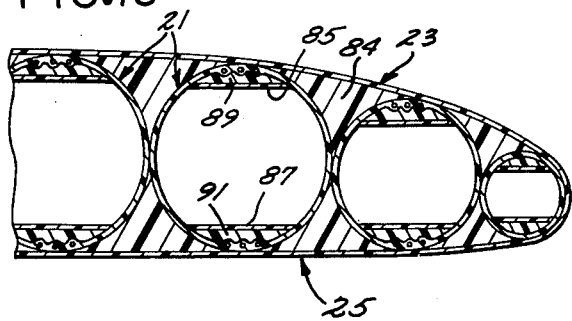

The lightweight load carrying structure shown in FIG. 10 is similar to that shown in FIG. 7 except that filler foam 84 is received in the cavities formed between the tube 21 and chordal walls 85 and 87 are formed in the upper and lower sides of such tubes to define respective chambers for receipt of additional stiffening foam 89 and 91 which acts to assist distributing forces applied to the surface of the skins 23 and 25.

From the foregoing, it will be apparent that applicants have provided a new and useful contoured load carrying structure which may conveniently be utilized in forming airfoils and hydrofoils and the like. The design characteristics throughout the length of a foil may easily be varied to correspond with the expected loads at different points therealong. By employing conventional fiber glass molding procedures the consequent resultant contour of the structure may be conveniently formed to a wide variety of specified designs. Thus, it will be appreciated that various weight distributions throughout the cross sections of airfoils, such as helicopter rotor blades, may conveniently be attained by merely varying the contour of the tubes utilized and the various wall thickness and weighting thereof. Additionally, the tubes act as redundant load paths along the structure thereby enabling the structure to withstand the destruction of a portion thereof without catastrophic failure of the entire structure as is the case with many conventional wings.

Various modifications and changes may be made with regard to the foregoing without departing from the spirit of the invention.

We claim:

1. A lightweight contoured load carrying structure having an elongated cross section of a selected contour and comprising:

a plurality of elongated filament wound tubular members disposed in a side-by-side relationship and cooperating together to form a tubular member assembly, the opposite cross section extremities of said tubular members cooperating to define substantially the contour of the opposite sides of said selected contour, at least some of said tubular members having a plurality of elongated reinforcement means in addition to the filaments of said tubular members and of a material different from said filaments extending longitudinally thereof, said reinforcement means being formed in the walls of said at least some tubular members and arranged between successive layers of said filament wound tubular members;

skin means wrapped around said opposite cross section extremities to cover said tubular member assembly; and bonding means affixing at least portions of said opposite cross section extremities of said tubular members to said skin means whereby said filament wound tubular members, reinforcement means and skin means, when loaded, will cooperate together in carrying longitudinal bending loads applied thereto as well as in distributing loads along the length of the composite cross section to extend substantially to said opposite side of said structure.

2. A lightweight contoured load carrying structure as set forth in claim 1 wherein:

said tubular members include a plurality of relatively large-in-cross section central tubular members with the tubular members on opposite sides thereof becoming progressively smaller-in-vertical-cross section to cause said contour of said structure to assume the contour of a fluid foil.

3. A lightweight contoured load carrying structure as set forth in claim 1 wherein:

said tubular members are constructed from at least one ply of circumferential filaments and at least one ply of spiral filaments.

4. A lightweight contoured load carrying structure as set forth in claim 1 wherein:

said skin means is in the form of fiber glass.

5. A lightweight contoured load carrying structure as set forth in claim 1 that includes:

a plurality of tubular members telescoped into said respective first mentioned tubular members and cooperating therewith to define filler spaces; and lightweight filler means disposed in said filler spaces.

6. A lightweight contoured load carrying structure as set forth in claim 1 wherein:

said skin means includes a first skin member and a second skin member spaced apart to form a filler chamber; and lightweight filler means disposed in said filler chamber and sandwiched between said first and second skin members.

7. A lightweight contoured load carrying structure as set forth in claim 1 wherein:

said tubular members are tapered from one end to the other.

8. A lightweight contoured load carrying structure as set forth in claim 1 wherein:

said tubular are formed from plies of winding filament extending substantially from one end to the other of said respective tubes.

9. A lightweight contoured load carrying structure as set forth in claim 1 wherein:

said bonding means affixes adjacent tubular members to one another.

10. The lightweight contoured load carrying structure of claim 1 wherein said skin means comprises a filament wound skin means.

11. The lightweight contoured load carrying structure of claim 10 wherein said skin means comprises a sandwich of at least one layer of circumferential filaments and at least one layer of spiral filaments.

12. A lightweight contoured load carrying structure having an elongated cross section forming a fluid foil contour and comprising:

a first plurality of elongated filament wound tubular members disposed in side-by-side relationship and cooperating together to form a tubular member assembly, the opposite cross-sectional extremities of said tubular members cooperating to define substantially the contour of the opposite sides of at least a portion of said fluid foil contour;

a second plurality of elongated filament wound tubular members telescoped into respective ones of said first plurality of tubular members and cooperating therewith to define filler spaces therebetween, said filler spaces having ligthweight, substantially noncompressive stiffening filler means disposed therein;

skin means wrapped around said composite cross section to cover said tubular members, said skin means including an inner skin member and an outer skin member spaced apart to form a filler chamber therebetween, said filler chamber having lightweight, substantially noncompressive stiffening filler means disposed therein and sandwiched between said skin members;

bonding means affixed at least said opposite cross-sectional extremities of said first plurality of tubular members to said inner skin member whereby said filament wound tubular members, filler means and skin means, when loaded, will cooperate together in carrying longitudinal bending loads applied thereto as well as in distributing loads along the length of the composite cross section to extend substantially to said opposite side of said structure.

13. The lightweight contoured load carrying structure of claim 12 wherein said skin means comprises a filament wound skin means.

* * * * *

UNITED STATES PATENT AND TRADEMARK OFFICE
CERTIFICATE OF CORRECTION

PATENT NO. : 4,079,903
DATED : March 21, 1978
INVENTOR(S) : Larry J. Ashton and Dale P. Abildskov It is certified that error appears in the above-identified patent and that said Letters Patent are hereby corrected as shown below:

Column 2, line 52, "would" should be -- wound --.

Column 6, line 64, after the word "tubular" insert -- members --.

Signed and Sealed this

Twenty-first Day of November 1978

[SEAL]

Attest:

RUTH C. MASON
Attesting Officer

DONALD W. BANNER
Commissioner of Patents and Trademarks